July 11, 1939.  M. P. LUTHER  2,165,560
INSECT EXTERMINATOR
Filed Jan. 18, 1937   2 Sheets-Sheet 2
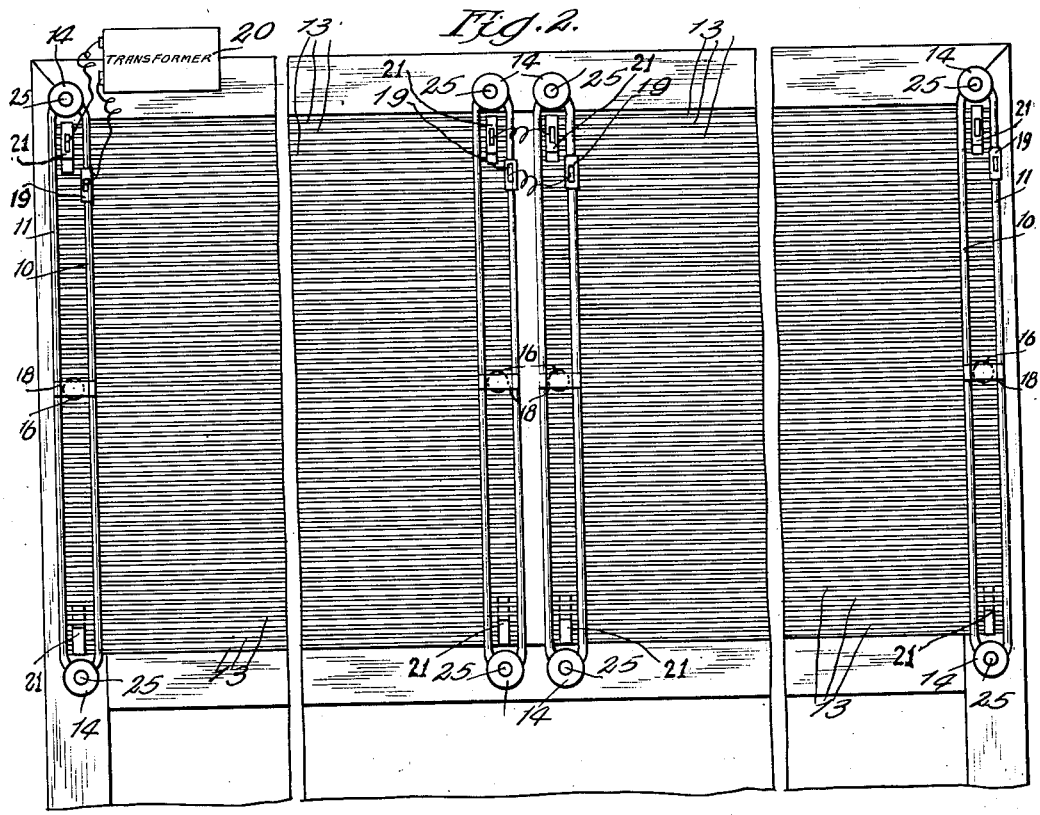
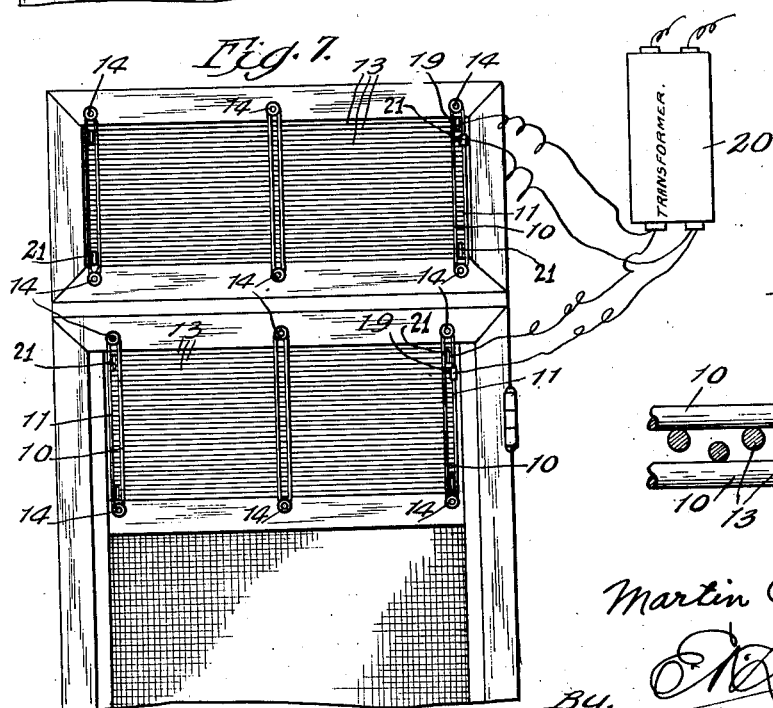
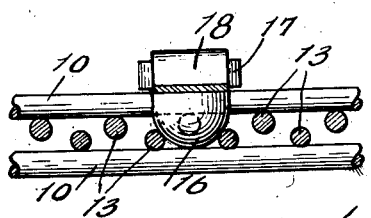
Inventor:
Martin P. Luther Patented July 11, 1939

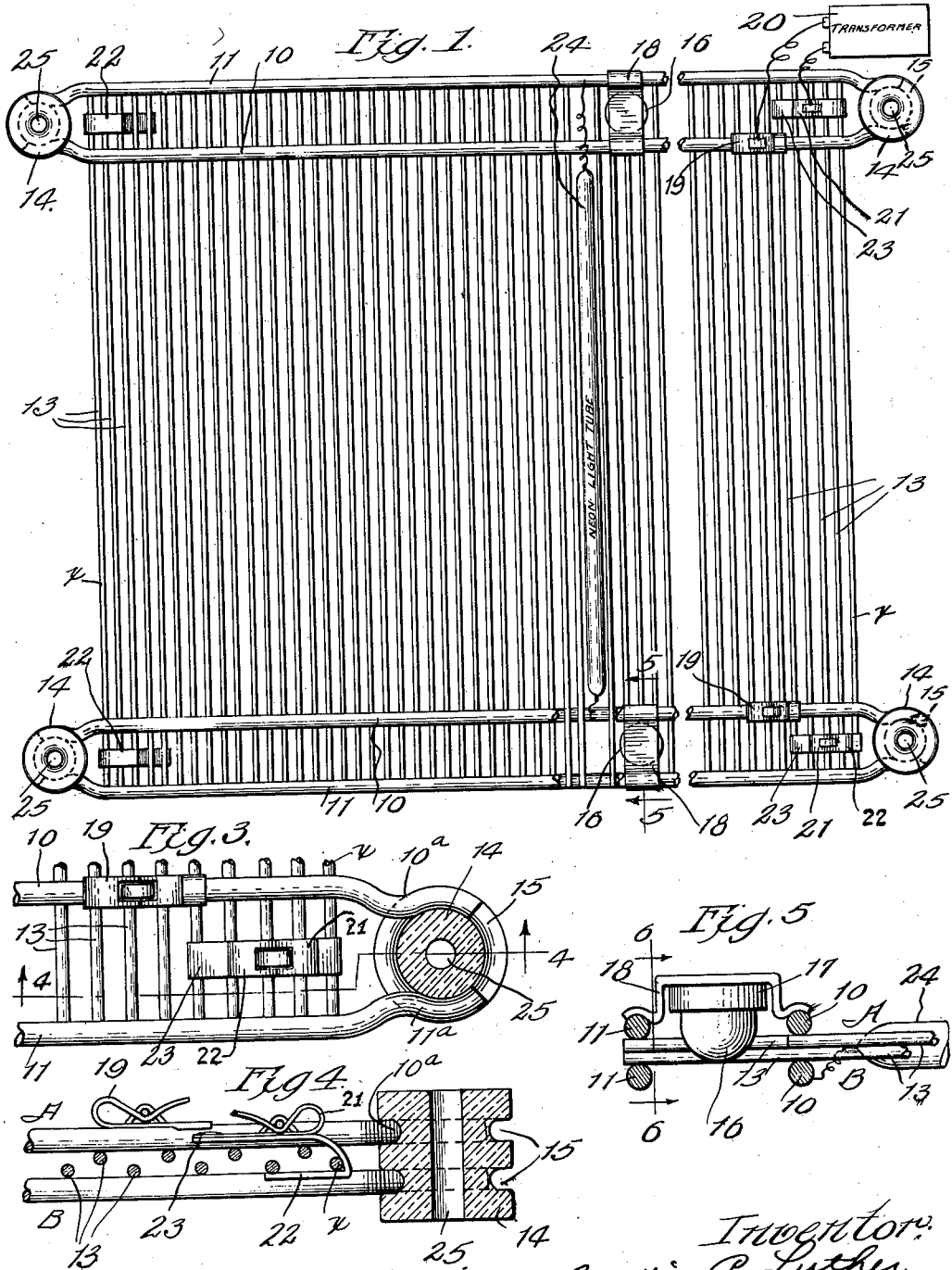

2,165,560

UNITED STATES PATENT OFFICE 2,165,560

INSECT EXTERMINATOR

Martin P. Luther, Chicago, Ill.

Application January 18, 1937, Serial No. 121,065

5 Claims. (Cl. 43—112)

My invention relates to devices for exterminating insects of the winged or flying type, and it has particular reference to an insect exterminating device which employs an electric current for stunning and killing the insects coming into contact with the charged electrodes of the device.

In my present structure I employ a pair of rigid metal grids or gratings providing opposed electrodes disposed in facing relation alongside each other, and these two grids are assembled face to face but insulated from each other in the form of a unitary panel. The transverse rods of the respective grids are disposed in alternating as well as staggered relation to each other and all the parts of the one grid are separated from corresponding parts of the opposing other or companion grid of a panel, a distance to provide a gap that is ample to prevent short-circuiting or sparking by other parts of the two grids. Each panel unit has provision whereby additional panels may be readily assembled in a series, preferably side-by-side in edge alinement for the purpose of increasing the area in which my exterminator is effective. The transverse or cross-rods of each grid which are the electrodes are rigid and thereby eliminate vibration or independent relative movement of these elements, thus preventing short-circuiting when the grid is struck by large bugs such as beetles or by birds and the like. The staggered relation of the rod electrodes also prevents damage due to articles being accidentally blown against a panel. The pair of grids forming a panel unit are assembled in a manner that permits them to be readily disassembled from each other without the use of tools for the purpose of inspection, adjustment or repair. By means of a neon light tube, which is substituted for one of the rods of a grid unit, I have provided efficient means for attracting the insects and other pests to the panel during and after nightfall. The structure I have invented is capable of production in a variety of sizes from small to large, and when the larger sizes are made I provide a novel separating insulator that is inserted between intermediate portions of the respective grids. The panels may be mounted in groups in a large opening, wherein each panel is a sectional unit of the whole structure extending across or in such opening.

The device I have herein disclosed is novel in construction; it is effective and dependable in performing the functions for which it has been designed; it is made of sturdy but simple parts and is capable of withstanding severe usage; and it is economical to manufacture so that it may be sold to the user for a reasonable retail price. Other advantages and objects of my invention will be obvious to persons skilled in the art after my improvements are understood from the within disclosure.

I prefer to practice my invention and to accomplish the numerous objects thereof by means of a structure such as hereinafter set forth in the appended claims, and in this connection reference is made to the accompanying drawings that form a part of this specification.

In the drawings:

Fig. 1 is a vertical elevation of a panel unit embodying my invention.

Fig. 2 is a front elevation showing several panels mounted in series in a wide opening or frame such as in a ventilator.

Fig. 3 is fragmentary view of one of the corner portions of the panel, drawn to a larger scale.

Fig. 4 is a section on line 4—4 of Fig. 3, looking up in the direction of the arrows.

Fig. 5 is a section on line 5—5 of Fig. 1, looking in the direction of the arrows and drawn to a larger scale.

Fig. 6 is a section on line 6—6 of Fig. 5, looking in the direction of the arrows.

Fig. 7 is a front elevation showing the installation of my invention upon a screen door and a transom.

The drawings will be understood as being more or less schematic and are for the purpose of disclosing typical or preferred embodiment of my invention. In said drawings like reference characters are employed to identify like parts wherever such parts appear in the several views.

The structure which I have disclosed embodies two grid-like electrodes A and B disposed in spaced and facing arrangement, the component parts of the one grid electrode being out of electrical as well as physical contact with each other although said electrodes are assembled in the form of a unitary panel. The grids are of substantially identical construction which for economy permits them to be assembled upon the same jig or form.

A grid consists of longitudinal supporting members each in the form of a pair of inner and outer elongated bars 10 and 11 that are parallel to each other and separated a suitable distance apart as seen in Figs. 1 and 3. A plurality of parallel grid rods 13 are arranged transverse to the longitudinal supporting members and are anchored thereto in any suitable manner, preferably by welding, to provide a rigid joint or connection. As will be seen these transverse grid rods extend past the inner bars 10 of the supporting members and terminate at or adjacent the outer bars 11. Thus, a grid-like unit of rigid construction is secured that readily adapts itself for being utilized as an electrode, and in practice it is preferred to place two of these grid-like units in facing juxtaposition to each other with the transverse rods of one grid disposed in alternate relation to the transverse rods of the other unit as clearly seen in detail in Fig. 4.

The ends of the bars 10 and 11 of the supporting members project beyond the series or row of grid-rods and have their end portions bent into ogee or S-shaped curves as shown at 10a and 11a in Fig. 3. Other curves, such as U-shaped bends may be substituted for those shown, the purpose of which bends is to permit the end portions of the bars 10 and 11 beyond the grid rods 13 to be yieldably snapped or forced upon insulator spools 14. These spools are preferably of porcelain and are provided with spaced parallel face grooves or channels 15 to receive the bent or deformed ends of the bars 10 and 11 and thereby maintain two of the grid units in spaced facing relation to and insulated from each other.

In mounting the grid units upon the insulator spools, the rods 13 of the respective grids are disposed on the sides of the grids that are closest to each other and are in a staggered as well as a spaced arrangement (see Fig. 4). Thus, these rods, as well as the supporting bars 10 and 11 of one grid are separated a distance from those of the other grid to prevent sparking or short-circuiting when the device is charged with electric current. When the panel above described is of such length that a lateral pressure upon opposite sides thereof will tend to bow or move the bars 10 and 11 of one grid towards those of the other grid, suitable insulator spacers are mounted on the supporting members. A spacer as shown in Figs. 5 and 6 consists of a hemispherical contact member 16 of glass or other suitable material that is cemented in a cap 17 and is anchored to a substantially U-shaped strap 18 that bridges the space between the bars 10 and 11 and has its ends welded to the respective bars. The curved portion of the glass member 16 fits between a pair of the electrode-rods 13 of the opposing grid unit and thus prevents lateral movement of the bars 10 and 11 towards the adjacent bars of the grid unit upon which the insulating spacer is mounted.

A spring metal clip 19 of any desired construction is welded or otherwise secured to one of the supporting bars 10 of a grid unit to receive one of the conductors leading from a transformer shown conventionally at 20. A second clip 21 receives the other conductor from the transformer, and said second clip 21 is mounted upon and is in electrical connection with the other grid unit. The manner of mounting the clip 21 embodies a U-shaped metal bracket, one of the arms 22 of which is welded to the outer portions of a pair of electrode rods (as shown in Fig. 4) and disposed transverse thereto so that the other portion of this bracket extends around the end rod designated as X in Fig. 4 to position the other arm 23 across but spaced from the adjacent rods of the other grid-unit.

The device is preferably operated upon alternating current or pulsating direct current that is picked up from the ordinary house service line of 110 v. or 220 v., and the transformer is of a type which changes this current to 2000 v., of 4 to 6 milli-amp. which is suitable for use in neon light tubes. In this connection I have shown a luminescent gas tube such as a neon tube 24 in Figure 1 substituted for one of the electrode rods of the nearest grid unit. This tube 24, which is elongated to extend between upper and lower mounting cross bars 10, is mounted in any suitable manner and the conductors at its opposite ends are connected to the respective grid units so that current will pass through and illuminate the tube whenever the circuit is formed. This illumination is useful because of the fact that insects and flying pests possess an inherent attraction for a light especially during periods of darkness. In operation, the current is turned on and the rigid electrode rods are thus charged and since these electrodes of the respective grids are properly spaced and alternated with each other, the insects will bridge the rods as they strike them and the high tension existing between two rods of different grids will pass through the insects and destroy them. In mounting a panel, comprising a pair of grid units, the structure is placed over or across an opening in a room or building and secured in place by long screws passed through the axial bores 25 of the insulator spools 14. A plurality of panels may be mounted in the manner shown in the drawings and said panels electrically connected in series as illustrated in Fig. 2 or each panel may be connected direct with the transformer as illustrated in Fig. 7.

What I claim is:

1. An electric insect exterminator comprising a pair of face-to-face grids each embodying a series of parallel electrode rods, and cross-bars connected to the ends of said rods, the end portions of said cross-bars being shaped to provide resilient insulator-engaging arms, and insulators provided with seats to receive the resilient arms of said bars and thereby maintain the two grids in spaced insulated relation to each other.

2. An electric insect exterminator comprising face-to-face grids that embody a plurality of alternately arranged members, one of said members constituting a luminescent gas tube and the remaining members constituting opposing electrode rods, and electric conductors connected to the respective grids, said tube having terminals that normally receive electric current from said conductors.

3. An electric insect exterminator comprising a pair of face-to-face grids that embody a plurality of alternately arranged members, one of said members constituting a luminescent gas tube and the remaining members constituting opposing electrode rods, and an electric conductor connected to each grid, said tube being disposed in the same plane with the rods of one of said grids and provided with terminals that normally receive electric current from said grids.

4. An electric insect exterminator comprising a pair of face-to-face grids, each grid embodying a series of parallel electrode rods, supporting bars arranged in pairs at opposite ends of and connected to said rods, each pair of bars having their end portions shaped in arcuate form with their concave portions facing each other to provide insulating receiving members, and insulators having annular seats in which the arcuate portions of said bars are disposed, each said insulator being engaged with a pair of said members of each grid and thereby maintaining said grids in their spaced face-to-face relation.

5. An electric insect exterminator comprising a pair of face-to-face grids, each grid embodying a series of parallel electrode rods, supporting bars arranged in pairs at opposite ends of and connected to said rods, the end portions of each pair of bars projecting beyond the outermost rods of each grid and bowed in opposite directions, and cylindrical insulators each having parallel annular grooves in which the bowed portions of said bars are seated whereby said grids are maintained in insulated facing relation to each other.

MARTIN P. LUTHER.